(12) United States Patent
Sasada (10) Patent No.: US 8,304,040 B2
(45) Date of Patent: Nov. 6, 2012

(54) POLYMER FILM AND PREPARATION METHOD OF POLYMER SOLUTION

(75) Inventor: Yasuyuki Sasada, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 565 days.

(21) Appl. No.: 11/041,978

(22) Filed: Jan. 26, 2005

(65) Prior Publication Data

US 2005/0163923 A1    Jul. 28, 2005

(30) Foreign Application Priority Data

Jan. 26, 2004 (JP) ................................. 2004-017100

(51) Int. Cl.
 *C09K 19/00* (2006.01)
(52) U.S. Cl. .................... 428/1.33; 106/171.1; 349/117; 349/118; 264/207; 264/208
(58) Field of Classification Search .................. 428/1.33, 428/1.54; 349/117–118, 122; 106/171.1; 264/207–208
See application file for complete search history.

(56) References Cited

U.S. PATENT DOCUMENTS

| | | | |
|---|---|---|---|
| 6,211,358 B1 * | 4/2001 | Honda et al. | 536/64 |
| H2083 H * | 10/2003 | Bogard et al. | 428/1.1 |
| 6,630,973 B1 * | 10/2003 | Matsuoka et al. | 349/117 |
| 6,731,357 B1 * | 5/2004 | Tachibana et al. | 349/96 |
| 6,777,100 B2 * | 8/2004 | Sumita et al. | 428/481 |
| 7,006,173 B1 * | 2/2006 | Hiyama et al. | 349/96 |
| 7,060,333 B2 * | 6/2006 | Takeuchi et al. | 428/1.3 |
| 7,122,660 B1 * | 10/2006 | Nakanishi et al. | 536/69 |
| 7,166,321 B2 * | 1/2007 | Ogawa et al. | 427/162 |
| 7,220,460 B2 * | 5/2007 | Murakami et al. | 427/491 |
| 7,542,207 B2 * | 6/2009 | Matsunaga | 359/599 |
| 2002/0041352 A1 * | 4/2002 | Kuzuhara et al. | 349/117 |
| 2002/0102369 A1 * | 8/2002 | Shimizu et al. | 428/1.33 |

(Continued)

FOREIGN PATENT DOCUMENTS

| | | |
|---|---|---|
| EP | 1285931 A1 * | 2/2003 |
| JP | 09-095538 | 4/1997 |
| JP | 09-095544 | 4/1997 |
| JP | 09-095557 | 4/1997 |
| JP | 2003-236915 | 8/2003 |

OTHER PUBLICATIONS

JPO Website Machine English Translation of JP 2002-265639, Yasuo, Sep. 18, 2002.*

(Continued)

*Primary Examiner* — Angela Ortiz
*Assistant Examiner* — Ruiyun Zhang
(74) *Attorney, Agent, or Firm* — Buchanan Ingersoll & Rooney PC (57) ABSTRACT

A polymer is swollen in a first tank. The swelling temperature is in the range of −10 to 50° C. The mixture is cooled in a first cooling vessel to the range of −100 to −10° C., and thereafter heated in a heating device to the range of 0 to 57° C. The polymer is cellulose acylate in which a degree of substitution of the acyl group for hydroxyl group is at least 2.87. A film obtained from the cellulose acylate has a negative value of ΔRe and a positive value of ΔRth, and |ΔRth| is at least 10 nm. ΔRe and ΔRth are respective difference of Re and Rth at the measurement thereof with use of wavelengths between 700 nm and 400 nm. The film is used adequately as a birefringence film, a protective film for a polarizing filter in a liquid crystal display.

11 Claims, 3 Drawing Sheets

U.S. PATENT DOCUMENTS

| | | |
|---|---|---|
| 2003/0015820 A1* | 1/2003 | Yamazaki et al. ............ 264/217 |
| 2003/0027004 A1* | 2/2003 | Katai ........................... 428/452 |
| 2003/0212171 A1* | 11/2003 | Frederick et al. ............. 524/141 |
| 2003/0224113 A1* | 12/2003 | Nakamura et al. ......... 427/372.2 |
| 2004/0030006 A1* | 2/2004 | Tsujimoto et al. ........... 523/343 |
| 2004/0036828 A1* | 2/2004 | Aminaka et al. .............. 349/117 |
| 2004/0058179 A1* | 3/2004 | Yamazaki et al. ............ 428/532 |
| 2004/0096594 A1* | 5/2004 | Takeuchi et al. ............... 428/1.2 |
| 2004/0150331 A1* | 8/2004 | Okubo et al. ................. 313/506 |
| 2004/0241344 A1* | 12/2004 | Kawanishi et al. ............ 428/1.1 |

OTHER PUBLICATIONS

JPO Website Machine English Translation of JP 2002-212338, Tsukasa, Jul. 31, 2002.*

JPO Website Machine English Translation of JP 2002-265501, Tsukasa, Sep. 18, 2002.*

* cited by examiner

FIG.3

POLYMER FILM AND PREPARATION METHOD OF POLYMER SOLUTION

BACKGROUND OF THE INVENTION

1. Field of the Invention

The present invention relates to a polymer film and a preparation method of a polymer solution, especially to a polymer film adequately used for a retardation filter, a polarizing filter and an image displaying device, and a preparation method of a polymer solution used for producing the polymer film in a solution casting method.

2. Description Related to the Prior Art

For a photosensitive material of silver halide, a birefringence filter, a polarizing plate and an image display device is used a polymer represented by cellulose ester, polyester, polycarbonate, cycloolefine polymer, vinylpolymer and polyimide. A polymer film produced from the polymers is usually produced in a solution casting method or a melt-casing method. For example, Japanese Patent Laid-Open Publication No. 2003-236915 disclose a method in which cycloolefin co-polymer having a relatively low glass transition point Tg and a relatively low melting point Tm is used to produce a film for optical use in a melt extruding method. Otherwise, in the solution casting method, a polymer solution in which polymer is dissolved into a solvent is cast on a substrate continuously conveyed, and when having a self-supporting properties, the cast polymer is peeled from the substrate. Then the solvent is evaporated. In comparison to the melt extruding method, the polymer film which is more excellent in planarity and uniformity can be produced, and therefore widely adopted for an optical use. A representative example of the film for optical use as a production in the solution casting method is a cellulose ester film which is used as a silver halide photosensitive material and a protective film of a polarizing filter.

As a solvent for preparing the cellulose ester solution used for producing a cellulose ester film, chlorine type hydrocarbon such as dichloromethane is used. However, the research for using other solvents type for cellulose ester than the chlorine type organic solvent proceeds. For example, organic solvents having a dissolubility to cellulose ester, especially cellulose triacetate are acetone (boiling point 56° C.), methyl acetate (boiling point 56° C.), tetrahydrofurane (boiling point 65° C.), 1,3-dioxolane (boiling point 75° C.), 1,4-dioxane (boiling point 101° C.) and the like. However, since these organic solvents don't have enough dissolubility for practice actually, a cool-dissolving method in which cellulose ester is dissolved in a low temperature is combined. For example, in the publication "Makromol. Chem., 1971, Vol. 143, P105", cellulose triacetate (acetylation degree in the range of 60.1% to 61.3%) is cooled in acetone to have a temperature in the range of −80° C. to −70° C., and thereafter the heating is made such that a dilute solution in which the content of cellulose acylate is in the range of 0.5.% to 5% may be obtained. Further, the publication in "Journal of Textile Machinary Society, 1981, Vol 34, p. 57-61" proposes a fiber spinning technique with use of the cool-dissolving method. Further, in Japanese Patent Laid-Open Publications No. 9-95538, 9-95544 (pages 4-7), 9-95557 (pages 4-8), non-chlorine type organic solvents are used, and cellulose acylate is dissolved to the organic solvents for preparing the solution.

Recently the demands of the image display device is large. The liquid crystal display includes the retardation filter and the protective film for the polarizing filter. The improvement of the compensatory character of the birefringence is required in accordance with widening the view angle. However, in the film above described, a wavelength diffusion value (ΔRe) of an in-plane retardation (a retardation in an in-plane direction) and a wavelength diffusion value (ΔRth) of a thickness retardation (or a retardation in a thickness direction) has the same sign. Accordingly, the optical compensation method or the compensatory character are restricted. Therefore a method in which the wavelength relativity of each retardation is independently controlled is necessary.

However, in order to obtain the image displaying device in which the wavelength relativity is satisfied in accordance with widening the view angle, it is necessaty to control the birefringence of the polymer film used, and the control method has a limitation so far as being the stretch by a tenter in the prior solution casting method, and a mechanical treatment. Further, in the solution casting method, the birefringence control method to supply the polymer film with the optical compensatory character enough to satisfying the above wavelength relativity, although the film having more excellent optical property than the melt extruding method can be produced. Otherwise, according to a preparation method of the polymer solution used in the solution casting method, the supposition of improvement of the solubility is made. However, there are only some examples of the preparation method in view of optical properties of the birefringence of the produced film.

SUMMARY OF THE INVENTION

An object of the present invention is to provide a polymer film used in an image displaying device having the wavelength relativity adequate for widening the view angle.

Another object of the present invention is to provide a polymer film in which the birefringence is controlled.

Still another object of the present invention is to provide a preparation method of a polymer solution used for producing the polymer film.

In order to achieve the object and the other object, a polymer film has an in-plane retardation Re(n) and a thickness retardation Rth(n) measured with use of a light of wavelength n (unit; nm). ΔRe is calculated by Re(700)−Re(400), and ΔRth is calculated by Rth(700)−Rth(400). A sing of ΔRth is opposite to that of ΔRe.

Preferably, the value ΔRth satisfies a formula, 10 nm≦|ΔRth|≦1000 nm, and the value ΔRe is negative. The main content of the polymer film is cellulose acylate having a degree of acylation at least 2.87.

Preferably, the polymer film is used as a retardation filter in a liquid crystal display including a liquid cell sandwitched by a pair of orientation layers, and the retardation filter is oppositely disposed on the orientation layer to the liquid crystal cell.

Preferably, the polymer film is used as a protective film for a polarizing filter. The protective film is adhered to at least one surface of a polarized film of the polarizing filter.

In the present invention, in a preparation method of a polymer solution from a mixture containing a polymer and a solvent, a temperature of the mixture is regulated in a range of −10° C. to 50° C. such that the polymer may absorb the solvent to swell. After the swelling, the mixture is cooled such that the temperature of the mixture may be lower than at the swelling and in the range of −100° C. to −10° C. After the cooling, the mixture is heated such that the temperature of the mixture may be in the range of 0° C. to 57° C.

Preferably the cooling of the mixture is performed under a decreased pressure. The main content of the solvent is chlorine type organic solvent. Further, the main content of the polymer is cellulose acylate having a degree of acylation at least 2.87.

The polymer film of the present invention is excellent in the wavelength relativity of the optical compensation characters even though the view angle becomes wider. Accordingly, the polymer film can be adequately used for a retardation filter or a protective film for a polarizing filter in the image displaying device. Further, according to the preparation method of the polymer solution of the present invention, the dissolubility of the polymer to the solvent is increased, and when the polymer solution is used for the film production, the main chains and the branched chains of the polymer can be arranged in a predetermined condition. Therefore, the produced polymer film can have predetermined birefringence.

BRIEF DISCRIPTION OF THE DRAWINGS

The above objects and advantages of the present invention will become easily understood by one of ordinary skill in the art when the following detailed description would be read in connection with the accompanying drawings.

PREFERRED EMBODIMENTS OF THE INVENTION

In followings, embodiments of the present invention will be described in detail. First, in the present invention, an in-plane retardation (Re) and a thickness retardation (Rth) are calculated from following formulae (1) and (2). In the formulae (1) and (2), nx is a refractive index along a slow axis in a surface of a polymer film, ny is a refractive index along a fast axis in the surface of the polymer film, nz is a refractive index in a normal direction of the surface of the polymer film, and d is a thickness (unit: nm) of the polymer film.

$$Re=(nx-ny)\times d \quad (1)$$

$$Rth=\{(nx+ny)/2-nz\}\times d \quad (2)$$

In this embodiment, these retardations are measured value. In order to obtain the measured values, the polymer film is disposed in the atmosphere at 25° C. and 60% relative humidity for 24 hours, and then the retardation is measured with use of a He—Ne laser light source of ellipsometer (type; M-150, produced by Jasco Corporation). Further, when the measurement of the polymer film having high retardation beyond 100 nm is made, several sorts of automatic birefringence meter in the market (for example, type; KOBRA-21, produced by Oji Scientific Instruments, and the like) are used for the measurement, and the measurement data is used for calculating the retardation in a calculation method already known.

In the following explanation, when the measured wavelength is n (unit; nm), the in-plane retardation is Re(n) and the thickness retardation is Rth(n). In this case, a wavelength dispersion ΔRe of the in-plane retardation Re is calculated from a formula Re(700)−Re(400), and a wavelength dispersion ΔRth of the thickness retardation Rth is calculated from a formula Rth(700)−Rth(400). After the polymer film is disposed at 25° C. and 60% relative humidity for 24 hours, the ΔRe and ΔRth are obtained on the basis of the above formulae with use of the Xe light source by the above ellipsometer, while the measurement wavelengths are 400 nm and 700 nm.

In the polymer film of the prior art, the wavelength dispersions ΔRe and ΔRth have the same positive or negative sign. Therefore, it is hard in the prior polymer film to independently control the wavelength relativity when the polymer film is used as the birefringence film. However, the polymer film of the present invention, one of the ΔRe and ΔRth is positive and other is negative. Therefore, when the polymer film of the present invention is singularly used or a combination thereof with other polymer film is used as the birefringence filter, the wavelength relativities of the in-plane retardation Re and the thickness retardation Rth of the obtained retardation filter can be independently controlled. Accordingly, the obtained retardation filter has a merit to compensate more for the wavelength relativity of the retardation caused in accordance with change of the view angle. As above, the polymer film of the present invention is singularly used as the retardation film. Otherwise, in the birefringence filter, the combination of the plural polymer films of the present invention or that of the polymer film of the present invention with the other polymer film can be used as a part of the birefringence filter.

By the way, in order to compensate the phase difference more, the value |ΔRth| is preferably larger. Therefore when the value |ΔRth| of the used film is small, it is necessary to use the plural films which are superimposed. If the value |ΔRth| becomes smaller, it is necessary to make the number of the overlapped plural films larger. In this case, the total thickness thereof becomes larger. Therefore when they are used in the image display device, the thickness of the image displaying device increases. Further, between the overlapped films, there are displacements, which sometimes causes a color drift.

Accordingly, additionally to the above conditions of ΔRe and ΔRth, the value |ΔRth| is at least 10 nm. Thus the number of the superimposed films necessary for the compensation for the predetermined phase difference becomes smaller than that in the prior art, and therefore the thickness of the birefringence filter becomes smaller, and the generation of the color drift is prevented. The value |ΔRth| is preferably in the range of 10 nm to 1000 nm, particularly in the range of 12 nm to 500 nm, and especially in the range of 15 nm to 100 nm. Note that it is concretely difficult to set the value |ΔRth| to 1000 nm.

The value |ΔRe| preferably in the range of 10 nm to 1000 nm. When the value |ΔRe| is more than 1000 nm, the film is easily influenced by the external elements, such as external stress, humidity and the like, and therefore this condition is not preferable. Further when the value |ΔRe| is less than 10 nm, the number of the films must be increased and the used films are overlapped in order to make the complete compensation for the phase difference. Accordingly, the same as the value |ΔRth|, there would be problems in the point of the thickness and the color drift. The value |ΔRe| is particularly preferably in the range of 10 nm to 500 nm, and especially 10 nm to 200 nm, sometimes preferably in the range of 10 nm to 150 nm, and especially 10 nm to 100 nm. Note that the value |ΔRe| is negative and the value |ΔRth| is positive in the film of the present invention.

Further, the polymer film is preferably transparent, and the main component of the polymer film is preferably cellulose ester. As the cellulose ester, single sort or a mixture of two or more sorts of cellulose ester may be used. However, the especially preferable example thereof is cellulose acylate. Note that the above main component means the polymer component of at least 55% by mass, preferably at least 70% by mass, and especially 80% by mass.

The cellulose is constructed of glucose units making β-1,4 combination, and each glucose unit has a liberated hydroxyl group at second, third and sixth positions. Cellulose acylate is a polymer in which part or whole of the hydroxyl groups are esterified by acyl groups. The degree of substitution for the acyl groups in cellulose acylate is a degree of esterification at second, third or sixth position in cellulose. Accordingly, when all (100%) of the hydroxyl group at the same position are substituted, the degree of substitution at this position is 1. Further, when all of the hydroxyl group at all positions, the degree of substitution is 3. In the present invention, the degree of substitution of cellulose acylate preferably satisfies a condition (I), and particularly satisfies further conditions (II) and (III). Note that in the conditions (I), (II), (III) SA represents the degree of substitution of acetyl groups, and SB represents the degree of substitution of acyl groups in which the number of carbon atom is from 3 to 22.

(I) $2.87 \leqq SA+SB \leqq 3.00$
(II) $0.0 \leqq SA \leqq 3.0$
(III) $0.0 \leqq SB \leqq 3.0$ The total of the degrees of substitution SA and SB for the hydroxyl group is preferably from 2.87 to 2.96, particularly from 2.88 to 2.95, and especially from 2.90 to 2.95.

The group X on the acyl group (—COX) which satisfies the above three conditions and has 2 to 22 carbon atoms is not restricted especially, and may be aliphatic group (—R) or aryl group (—Ar). Accordingly, as an example of the cellulose acylate, there are alkylcarbonyl ester, alkenylcarbonyl ester, aromatic carbonyl ester, aromatic alkylcalbonyl ester and the like. Further, the cellulose acylate may be also esters having other substituted groups. The preferably acyl groups having 3 to 22 carbon atoms are propionyl group, butanoyl group, keptanoyl group, hexanoyl group, octanoyl group, decanoyl group, dodecanoyl group, tridecanoyl group, tetradecanoyl group, hexadecanoyl group, octadecanoyl group, iso-butanoyl group, t-butanoyl group, cyclohexane carbonyl group, oleoyl group, benzoyl group, naphtylcarbonyl group, cinnamoyl group and the like. Among them, propionyl group, butanoyl group, dodecanoyl group, octadecanoyl group, t-butanoyl group, oleoyl group, benzoyl group, naphtyl carbonyl group, cinnamoyl group and the like are particularly preferable.

The viscosity-average of polymerization degree of cellulose acylate used in the present invention is 200-700, preferably 250-550, particularly 250-400, and especially 250-350. The viscosity-average of polymerization degree is measured in a limiting viscosity method (Sen'i Gakkaishi, vol 18 No. 1, Page 105-120, Kazuo Uda, Hideo Saito, 1962). Further, the Japanese Patent Laid-Open Publication No. 9-95538 teaches the limiting viscosity method in detail.

In the present invention, the cellulose ester is preferably particles. At least 90% in mass of the used particles preferably has a particle diameter in the range of 0.5 to 5 mm, and at least 50% in mass of the used particles particularly preferably has a particle diameter in the range of 1 to 4 mm. Further, it is preferable that the particles has a nearly ball-like shape.

By the way, cellulose ester usually contains water, and it is known that the water content is usually 2.5% by mass-5% by mass. Accordingly, when the cellulose ester is used in the present invention, the water content is preferably at most 2% by mass, particularly at most 1% by mass, and especially at most 0.7% by mass. In order to obtain cellulose acylate satisfying the above conditions of the water content, it is necessary to make the drying. A drying method is not restricted so far as the cellulose acylate is not deteriorated.

Further, in the present invention, a cotton as a raw material of cellulose ester and a synthesizing method of cellulose ester is disclosed in Japan Institute of Invention and Innovation (JIII) JOURNAL of technical Disclosure No. 2001-1745 (Published on Mar. 15, 2001. p. 7-12, by Japan Institute of Invention and Innovation.

Further, in the polymer film of the present invention, other substances than cellulose ester can be used as the polymer. Namely, the other substances are, for example, the polymers as the main components of the film or precursors thereof, which are dissolved to a solvent for preparing the polymer solution. For example, there are several sorts of polyolefins (polyethylene and the like), polystyrene, polyvinylchloride, polyvinylidenechloride, polycarbonate, polyamides and the like.

In followings, a preparation method of polymer solution of the present invention will be described.

In the present invention, the predetermined polymer is dissolved to solvents, and thus the polymer solution is obtained and cast onto a support. The sort of the solvent is not restricted so far as a polymer film formed from the polymer solution satisfies several characteristics, such as mechanical strength, elastic modulus, heat resistance and the like. However, the solvent is preferably chlorine type organic solvent, particularly dichloromethane and chloroform, and especially dichloromethane. However, the organic solvent other than chlorine type organic solvent, that is non-chlorine type organic solvent, may be mixed to the chlorine type organic solvent. In this case, it is preferable to mix dichloromethane such that the content thereof in whole solvent may be at least 50% by mass.

The non-chlorine type solvent components which are used with the chlorine type solvent components will be described in following. The non-chlorine type organic solvent components are preferably esters, ketones, ethers, alcohol, hydrocarbons having 3-12 carbon atoms and the like. These esters, ketones, ethers, alcohols may have a cyclic structure. Further, compounds having at least two functional groups in ester, ketone, and ether (namely —O—, —CO—, and —COO—) can be used as the solvent components, these compounds may simultaneously have other functional groups such as alcoholic hydroxyl group. In case of the solvent having these at least two functional groups, the number of carbon atoms in one molecule is preferably from 3 to 12. As esters having carbon atoms whose number is 3 to 12, there are ethyl formate, propyl formate, pentyl formate, methyl acetate, ethyl acetate, and pentyl acetate. As ketones having carbon atoms whose number is 3 to 12, there are acetone, methyl ethyl ketone, diethyl ketone, diisobutyl ketone, cyclopentanone, cyclohexanon and methylcylohexanon. As ethers having carbon atoms whose number is 3 to 12, there are diisopropylether, dimethoxymethane, dimethoxyethane, 1,4-dioxane, 1,3-dioxolane, tetrahydrofurane, anisole, and phenetol. Organic compounds having at least two functional groups are 2-ethoxyethylacetate, 2-methoxyethanol, and 2-butoxyethanol.

Further, alcohols simultaneously used with chlorine type organic solvent may have a straight chain structure, a branched chain structure, and a cyclic structure. Alcohols are primary to tertiary alcohols, for example, methanol, ethanol, 1-propanol, 2-popanol, 1-butanol, 2-butanol, t-butanol, 1-pentanol, 2-methyl-2-butanol, cyclohexanol and the like. Further fluorine type alcohols can be used, for example, 2-fluoroethanol, 2,2,2-trifluoroethanol, 2,2,3,3-tetrafluoro-1-propanol and the like. Further, hydrocarbon groups may have straight chain, branched chain, or cyclic chain. The aromatic hydrocarbon and the aliphatic hydrocarbon can be used. The aliphatic hydrocarbon may be saturated and non-saturated. As example of hydrocarbon, there are cyclohexane, hexane, benzene, toluene and xylene.

In the present invention, when cellulose ester is used as the polymer, the combination of the chlorine type and non-chlorine type organic solvents for the polymer solution are shown in followings. However, the present invention is not restricted in them. Note that in the description of the following combination, each rate in parentheses is parts by weight of composition of each solvent material.

dichloromethane/methanol/ethanol/butanol (75/10/5/5/5)
dichloromethane/acetone/methanol/propanol (80/10/5/5)
dichloromethane/methanol/butanol/cyclohexane (75/10/5/5/5)
dichloromethane/methylethylketone/methanol/butanol (80/10/5/5)
dichloromethane/acetone/methylethylketone/ethanol/isopropanol (75/10/10/5/7)
dichloromethane/cyclopentanone/methanol/isopropanol (80/10/5/8)
dichloromethane/methyl acetate/butanol (80/10/10)
dichloromethane/cyclohexanon/methanol/hexane (70/20/5/5).
dichloromethane/methylethylketone/acetone/methanol/ethanol (50/20/20/5/5)
dichloromethane/1,3-dioxolane/methanol/ethanol (70/20/5/5)
dichloromethane/dioxane/acetone/methanol/ethanol (60/20/10/5/5)
dichloromethane/acetone/cyclopentanone/ethanol/iso-butanol/cyclohexane (65/10/5/5/5)
dichloromethane/methylethyl ketone/acetone/methanol/ethanol (70/10/10/5/5)
dichloromethane/acetone/ethyl acetate/ethanol/butanol/hexane (65/10/10/5/5/5)
dichloromethane/methyl acetoacetate/methanol/ethanol (65/20/10/5)
dichloromethane/cyclopentanone/ethanol/butanol (65/20/10/5)

Further, when cellulose solution is prepared as the polymer solution of the polymer preferably used in the present invention, the non-chlorine solvent component may be the main solvent component. In this case, the non-chlorine type organic solvent is preferably esters, ketones and ethers, in which each molecule has 3 to 12 carbon atoms. These esters, ketones, and ethers may have a cyclic structure.

Further, compounds having at least two functional groups in ester, ketone, and ether (namely —O—, —CO—, and —COO—) can be used as the main solvent components, these compounds may simultaneously have other functional groups such as alcoholic hydroxyl group. In case of the solvent having these at least two functional groups, the number of carbon in one molecule is preferably from 3 to 12. As esters having carbon atoms whose number is 3 to 12, there are ethyl formate, propylformate, pentylformate, methylacetate, ethylacetate, and pentyl acetate. As ketones having carbon atoms whose number is 3 to 12, there are acetone, methylethylketone, diethylketone, diisobutylketone, cyclopentanone, cyclohexanon and methylcyclohexanon. As ethers having carbon atoms whose number is 3 to 12, there are diisopropylether, dimethoxymethane, dimethoxyethane, 1,4-dioxane, 1,3-dioxolane, tetrahydrofurane, anisole, and phenetol. Organic compounds having at least two functional groups are 2-ethoxyethylacetate, 2-methoxyethanol, and 2-butoxyethanol.

The above non-chlorine type organic solvent as the main solvent is adequately selected, and preferable sorts are described as follows. Namely, the preferably solvent of the cellulose ester of the present invention is a mixture solvent of at least three compounds. The first component is single one or a mixture of methyl acetate, ethyl acetate, methyl formate, ethyl formate, acetone, dioxolane and dioxane, the second component is ketones or aceto acetate esters, in which each molecule has 4 to 7 carbon atoms, and the third component is alcohols or hydrocarbons in which each molecule has 1 to 10 carbon atom and preferably 1 to 8 carbon atom. Further, if the first component is a mixture of two solvent compounds, it is not necessary that the second component is contained in the solvent. The second component is preferably methylethylketone, cyclopentanone, cyclohexanone, methyl acetylacetate, and the mixture thereof.

Alcohols in the third component may have a straight chain structure and a branched chain structure, and otherwise may have a cyclic structure. Especially preferable alcohols are primary to tertiary alcohols, for example, methanol, ethanol, 1-propanol, 2-popanol, 1-butanol, 2-butanol, t-butanol, 1-pentanol, 2-methyl-2-butanol, cyclohexanol and the like. Further fluorine type alcohols can be used, for example, 2-fluoroethanol, 2,2,2-trifluoroethanol, 2,2,3,3-tetrafluoro-1-propanol and the like. Further, hydrocarbon groups may have straight chain, branched chain, or cyclic structure. The aromatic hydrocarbon and the aliphatic hydrocarbon can be used. The aliphatic hydrocarbon may be saturated or non-saturated. As example of hydrocarbon, there are cyclohexane, hexane, benzene, toluene and xylene. Single one or the mixture of at least two sorts of the alcohols and hydrocarbons can be used as the third component of the solvent. The preferable alcohols for the third component are methanol, ethanol, 1-propanol, 2-propanol, 1-butanol, 2-butanol, cyclohexanol, and other preferable solvent components are cyclohexane and hexane. Especially preferable are methanol, ethanol, 1-propanol, 2-popanol and 1-butanol.

In the mixture solvent containing at least three compounds, it is preferable that the content of the first component is 20 to 95% by mass, that of the second component is 2 to 60% by mass, and that of the third component is 2 to 30% by mass. Particularly preferably, the content of the first component is 30 to 90% by mass, that of the second component is 3 to 50% by mass, and that of the third component is 3 to 25% by mass. Especially preferably, the content of the first component is 30 to 90% by mass, that of the second component is 3 to 30% by mass, and that of the third component is 3 to 15% by mass. Note that when the first component is a mixture of the compounds and the second component is not used, it is preferable that the content of the first component is 20 to 90% by mass, and that of the third component is 5 to 30% by mass. Particularly preferably, the content of the first component is 30 to 86% by mass, and that of the third component is 7 to 25% by mass. The non-chlorine type organic solvent is described in detail in Japan Institute of Invention and Innovation (JIII) JOURNAL of Technical Disclosure No. 2001-1745 (Published on Mar. 15, 2001. p. 12-16, by Japan Institute of Invention and Innovation).

In the preparation method of the polymer solution of the present invention, the polymer is dissolved to the organic solvent such that the content of the polymer in the polymer solution may be preferably 10 to 50% by mass, particularly 13 to 40% by mass, and especially 15 to 30% by mass. In order to adjust the content, the polymer is mixed to the solvent such the polymer concentration may become to a predetermined value. Otherwise, the lower concentration polymer solution (for example 9 to 14% by mass) is prepared and thereafter condensed to a predetermined content in a predetermined condensing method. Otherwise, the higher concentration polymer solution is previously prepared, and thereafter several sorts of additives, and solvents and the like are added to the higher solution such that the concentration may become the predetermined value.

In the preparation of the polymer solution described below, several sorts of additives in accordance with use can be added at a predetermined timing, and they may be solid or oil-like materials. As the additives, there are plasticiser, modifying agent, UV-absorbing agent, UV-stabilizer, optical anisotropy controlling agent, particles, peeling agent, infrared light absorbing agent and the like. The sorts of them are not restricted independent on the melting point and the boiling point. For example, as Japanese Patent Laid-Open Publication No. 2001-151901, when the UV-absorbing agents and the plasticisers are used, the melting point of one of them may be at most 20° C. and that of another of them may be at least 20° C. Further, the infrared light absorbing agent is described in Japanese Patent Laid-Open Publication No. 2001-194522, and the disclosed sorts of the infrared light absorbing materials can be applied to the present invention. These additives may be added anytime in the preparation process of the polymer solution. Otherwise, in the end of the preparation process of the polymer solution, the addition may be made. Furthermore, the additional amount of the additives is not restricted especially. Further, the polymer film is formed of plural layers, the content and sorts of the additives may be different among the plural layers, and for example, the well-known technique as described in Japanese Patent Laid-Open Publication No. 2001-151902 may be applied to the present invention. The additives to be preferably used in the present invention are described in Japan Institute of Invention and Innovation (JIII) JOURNAL of technical Disclosure No. 2001-1745 (Published on Mar. 15, 2001. p. 16-22, by Japan Institute of Invention and Innovation.

When several sorts of the additives are used, it is preferable that at least one liquid or solid plasticiser is added to the polymer solution such that the content of the plasticiser to the polymer may be from 0.1 to 20% by mass. Further it is preferable that at least one liquid and solid UV-absorbing agent is added to the polymer solution such that the content of the UV-absorbing agent to the polymer may be from 0.001 to 5% by mass. Furthermore, it is preferable that at least solid particles whose averaged diameter is 5 to 3000 nm are added to the polymer solution such that the content of the particles to the polymer may be from 0.001 to 5% by mass. Preferably, at least one sort of fluorine type surfactant is added to the polymer solution such that the content of the surfactant to the polymer may be from 0.001 to 2% by mass. Preferably, at least one peeling agent is added to the polymer solution such that the content of the peeling agent to the polymer may be from 0.0001 to 2% by mass. Preferably, at least one deterioration inhibitor is added to the polymer solution such that the content of the deterioration inhibitor to the polymer may be from 0.0001 to 2% by mass. Preferably at least one optical anisotropy controlling agent is added to the polymer solution such that the content of the optical anisotropy controlling agent to the polymer may be from 0.1 to 15% by mass. Preferably, at least one infrared light absorbing agent is added to the polymer solution such that the content of the infrared light absorbing agent to the polymer may be from 0.1 to 5% by mass.

Explanations for a preparing method of a polymer film from the above polymer and solvent will be made in followings. In this embodiment, cellulose acylates whose degree of substitution by acyl group are 2.91 and 2.92 is used as the polymer, and a mixture of dichloromethane, methanol and butanol is used as the solvent. However, the present invention is not restricted in this embodiment.

Figure 1:
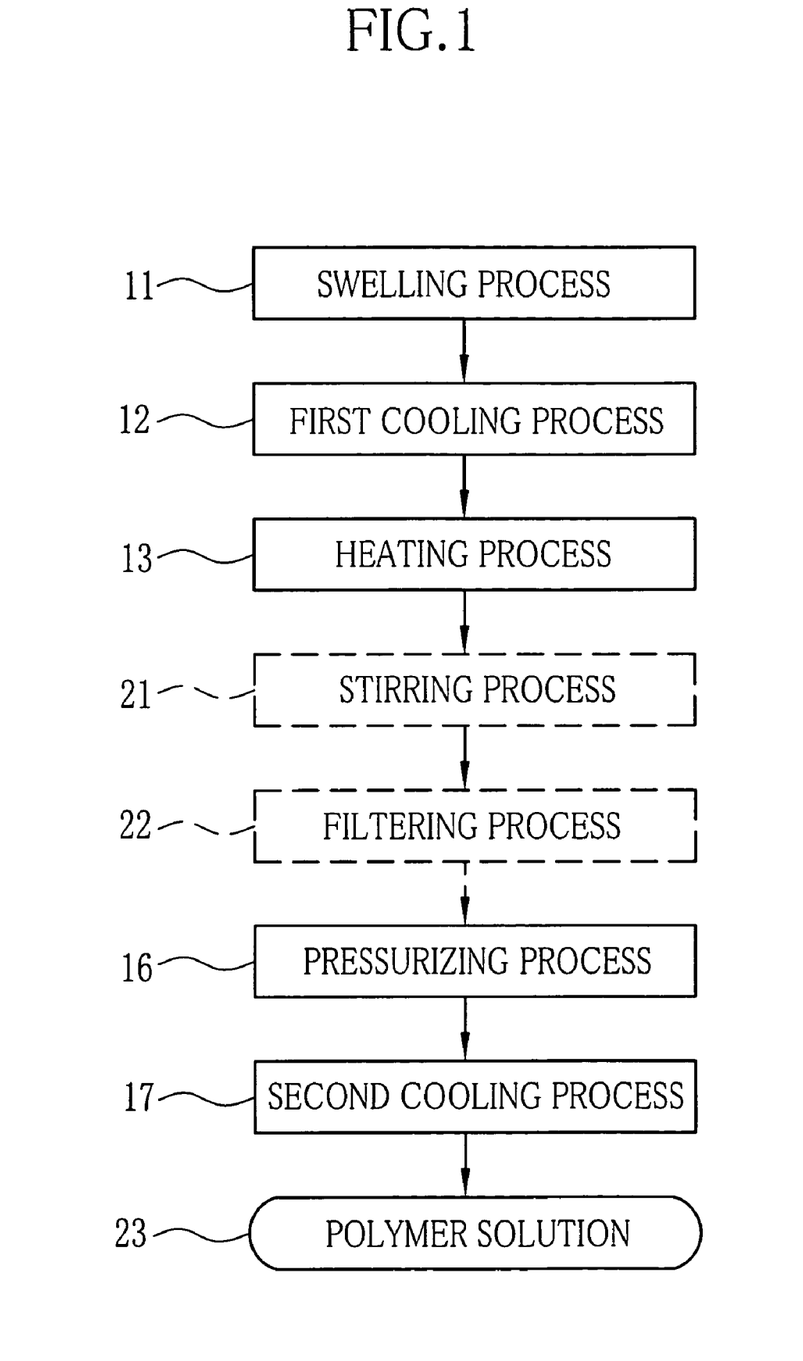
FIG. 1 is a process drawing for preparing a polymer solution, to which the present invention is applied.

FIG. 1 is a flow chart of processes for preparing the polymer solution as a first embodiment of the present invention. In the processes for preparing the polymer solution of this embodiment, there are a swelling process 11, a first cooling process 12, a heating process 13, a pressurizing process 16, and a second cooling process 17. Further, if necessary, at least one of a stirring process 21 and a filtering process 22 is performed after the heating process 13.

In the swelling process 11, the polymer and the solvent are mixed to swell the polymer in the solvent. In the first cooling process 12, the mixture obtained in the swelling process 11 is cooled to the predetermined temperature with use of a cooling device. In the pressurizing process 16, the mixture is heated to a predetermined temperature under increased pressure, and in the second cooling process 17 thereafter, the mixture is cooled again for the regulation of the temperature to the predetermined value. Thus the polymer solution 23 is obtained. Further, in the stirring process 21, the mixture after the heating process 13 is stirred such that the concentration or the degree of dispersion may be uniform. In the filtering process 22, solid materials having at least predetermined size and gel-like materials are removed from the mixture 23 through the filtration.

Figure 2:
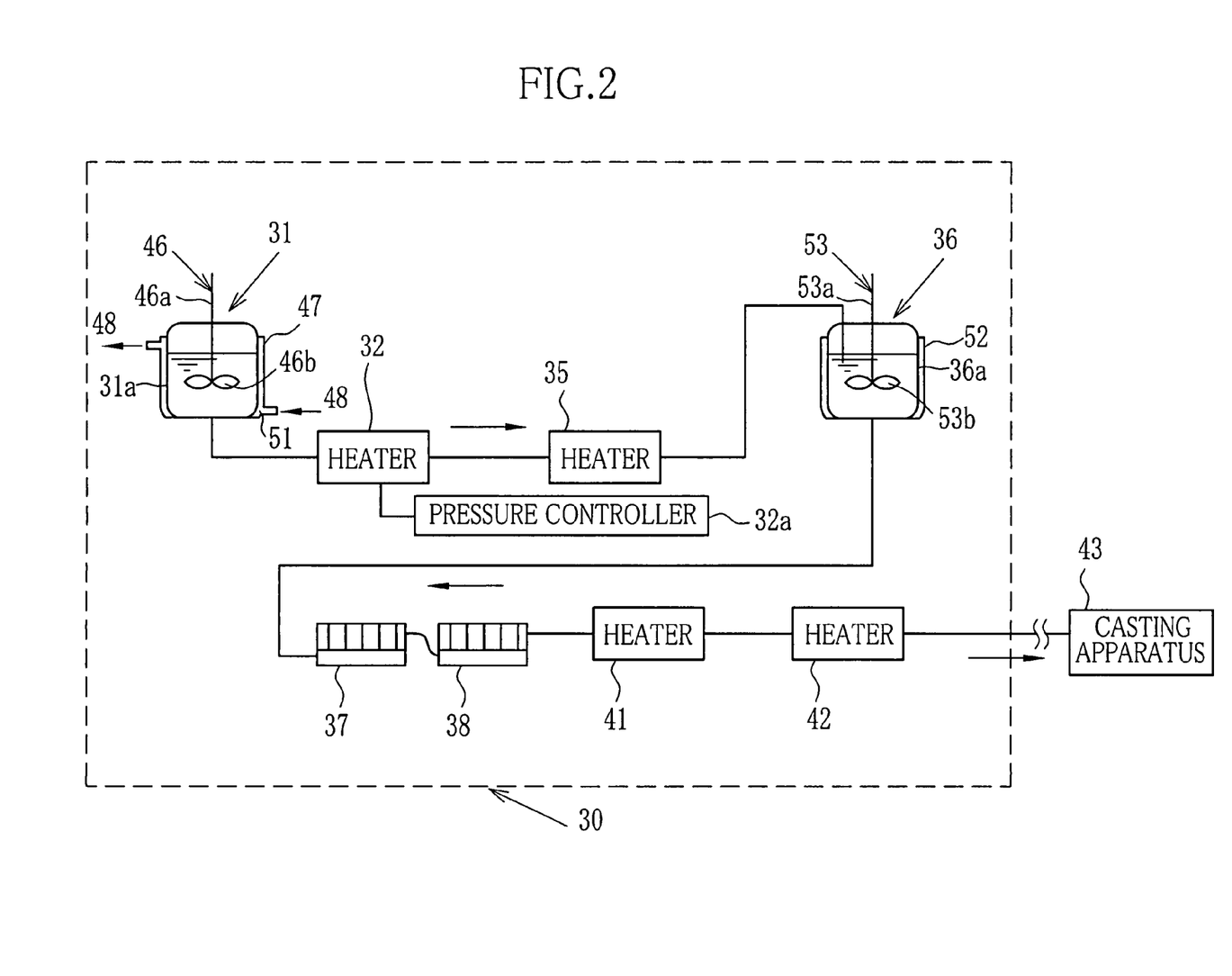
FIG. 2 is a schematic diagram of a preparation device of a polymer solution, to which the present invention is applied.

As shown in FIG. 2, a solution preparation apparatus 30 for the polymer solution is used in this embodiment, and includes a first tank 31 for performing the swelling of the polymer in the solvent, a first cooling device 32 for cooling the mixture, a heating device 35 for heating the mixture, a second tank 36 for stirring the mixture, first and second filtration devices 37, 38, a press-heating device 41 for heating the mixture under the increased pressure and a cooling device 42. The cooling device 42 is connected to a casting apparatus 43. Note that a feed pump (screw pump and the like) is provided on the feed path in this embodiment. However, the illustration thereof is omitted for easiness of the figure. Further, the preset invention is not restricted in the solution preparation apparatus 30.

The first tank 31 includes a stirrer 46. In this embodiment, the stirrer 46 is an eccentric stirrer of a dissolver type and includes a stirrer shaft 46a driven by a motor (not shown) and stirrer blades 46b attached to the stirrer shaft 46a. The motor is connected to a controller (not shown) and the rotary speed of the motor is controlled by the controller. Further, on the periphery of the first tank 31, there is a jacket 47. In a space between the jacket 47 and a tank main body 31a of the first tank 31 continuously flows a heat transfer medium 48 whose temperature is controlled to a predetermined value by a controller (not shown). In this embodiment, the heat transfer medium 51 is circularly fed between the controller and the space between the jacket 47 and the first tank 31.

As the heat transfer medium 51, there are several sorts of fluids, such as water, alcohols, nitrogen, air, brine, chlorofluorocarbon and the like. When the temperature thereof is controlled to more than 0° C., the preferable fluid to be used is water and air in view of cost and easiness of the treatment. Further, when the temperature is controlled to be lower than 0° C., the preferable fluid is, for example, ethyleneglycol, water, brine, chlorofluorocarbon and the like. Further, in the present embodiment, a pressure increasing device for controlling the inner pressure to a predetermined value with use of nitrogen gas is provided with the first tank 31, and thus the swelling efficiency is increased. However, the present invention does not depend on a structure of the first tank 31 and the temperature controlling method, and is not restricted so far as the temperature of the mixture is controlled to the predetermined value and the swelling of the polymer is made.

Each first cooling device 32 and heating device 35 has a temperature controller, and they respectively cools and heats the mixture containing swollen polymer to a predetermined value. In this embodiment, each of the first cooling device 32 and the heating device 35 is a screw pump provided with a jacket in which a heat transfer medium flows, and the temperature of heat transfer medium is controlled by each temperature controller such that the mixture may be cooled or heated so as to have a predetermined temperature. Note that the first cooling device 32 has a pressure controller 32a for controlling the pressure in the first cooling device to a predetermined value if necessary.

The second tank 36 has a tank main body 36a, a jacket 52, and a stirrer 53, similarly to the first tank 31. The stirrer 53 includes a stirrer shaft 53a and stirrer blades 53b attached to the stirrer shaft 53a. Further, the temperature of the heat transfer medium 55 flowing in the jacket is controlled such that the temperature of the mixture in the tank main body 36a may be controlled. And the stirrer 53 is driven to make the concentration or the dispersed concentration uniform.

Each first and second filtration device 37, 38 has a filter therein, by which the undissolved materials having more than predetermined sizes in the mixture are removed. The number of the filtering devices is two in this embodiment, and the absolute filtration accuracy is set to be larger in the first filtration device 37 than the second filtration device 38, such that the undissolved materials are removed step by step in accordance with the size. Thus the life of the second filtration device becomes longer. However the present invention is not restricted in it.

The press-heating device 41 performs the press-heating process in FIG. 1, and includes a pressure controller and temperature controller (not shown) for make the temperature equal to or more than the boiling point under the atmospheric pressure. As the method of controlling the pressure and the temperature, there are methods already known, and in this embodiment, the heat transfer medium is fed through a jacket while the inert gas is supplied therein and the pressure of the inert gas is controlled. Further, although the second cooling device 42 has no pressure controller, the other structure is the same in the second cooling device 42 as the first cooling device 32.

In this embodiment, the polymer solution 23 is prepared in the following method with use of the solution preparation apparatus 30. At first, the polymer and the solvent is mixed in the first tank 31, and the polymer is swollen at the predetermined temperature. Note that the order of supplying the polymer and the solvent into the first tank 31 is not restricted. Otherwise, the polymer and the solvent may be mixed in other vessel and the mixture may be thereafter fed into the first tank 31. When cellulose acylate is mixed with a solvent whose main solvent component is the dichloromethane, the polymer contains the solvent in the swelling process to be the gel-like materials. However, the swelling situation depends on the combination of the polymer and the solvent, and therefore the gel-like materials are sometimes semitransparent partially.

In the swelling process 11, the temperature of the mixture is controlled in the range of −10° C. to 50° C., such that the mixture of the polymer and the solvent may be made enough for preparing the transparent gel-like mixture. If the temperature is lower than −10° C., the time for swelling become longer and therefore the productivity becomes lower. In contrast, when the temperature is more than 50° C., the solvent evaporates, the polymer cannot swell uniformly, or agglomerates, particle-like materials (called "undissolved lump") or the like generate in the polymer solution. Note that the above adequate range of the temperature is determined on the basis of the combination of the polymer and the solvent in this embodiment, and when the combination is varied, the upper limit and the lower limit of the adequate range changes around 10° C.

In the first cooling device 32, the first cooling process 12 is performed so as to cool the mixture to a temperature in the range of −100° C. to −10° C. Thus the swelling situation of the polymer is efficiency made uniform. When the temperature is less than −100° C., the time for cooling becomes longer, and therefore the productivity becomes lower. When the temperature is higher than −10° C., the uniform polymer solution cannot be obtained. Further, in the first cooling process 12, the mixture is cooled under the increased pressure with use of the pressure controller 32a so as to uniformly swell the polymer.

In the heating device 35, the heating process 13 is performed such that the mixture may be heated in the range of 0° C. to 57° C. Thus the polymer can be dissolved enough. When a feed path from the first cooling device 32 to the second tank 36 is long and the temperature around the feed path is high, the temperature of the mixture can be in the above range without heating by the heating device 35. In this case, it is not necessary to provide the heating device 35. When the temperature of the mixture is lower than 0° C., the dissolution of the polymer is not enough, and the flowability of the polymer solution decreased. In contrust, when the temperature is higher than 57° C., the solvent evaporates. When the combination of the polymer and the solvent is varied, the upper limit and the lower limit of the adequate range of the temperature can be changed.

After the heating process 13, the mixture is stirred in the second tank 36 for a predetermined time with the heating if necessary, such that the concentration or the dispersed concentration may be uniform and the dissolution may proceed.

In the above method, the solubility of the polymer to the solvent becomes higher than the prior method. Therefore, the polymer having many branched chains can be also dissolved. Thus, in the film produced by the solution casting method, in which the main chain of the polymer molecule are directed along the film surface, the branched chains of the polymer molecule are directed in the thickness direction. Accordingly, the polymer film having the above retardation can be produced. Further, the solubility of the polymer becomes higher, the concentration of the obtained polymer solution becomes almost same as the value previously calculated in the supply of the raw materials. Accordingly, it is not necessary to provide the concentration adjusting process which is large.

By the way, the polymer as the raw material of the polymer solution often contains substances (for example monomers) which have not made a reaction, other polymers than the objected polymer, and foreign materials (for example dusts). Further, the foreign materials are sometimes mixed to the polymer solution in the processes before the stirring. Further, the mixture sometimes contains the gel-like materials and the like, whose dissolution is extremely hard even by any methods because of the quite large molecular weight in the polymer. When the polymer solution containing such undissolved materials are produced, the film becomes uneven or broken. Otherwise the optical properties of the produced film is decreased. Accordingly, the undissolved materials are removed by the filtration to prevent these problems.

Further, other processes can be provided in or after the pressurizing process 16 so as to increase the solubility of the polymer to the solvent more. In the press-heating process 16, the mixture is heated. The objected temperature of the heating is in the range of 60° C. to 240° C. The pressure is controlled in accordance with the heating temperature such that bubbles may not be generated, and the control range of the pressure is from 0.2 MPa to 30 MPa. Thus the mixture can be heated such that the temperature may be higher than the boiling point under the atmospheric pressure, and the dissolution can be proceeded, and the concentration of the prepared polymer solution becomes higher. When the temperature is lower than 60° C., the effect of the press-heating cannot become enough. When the temperature is higher than 240° C., the deterioration of the polymer and the additives occurs. Further, when the pressure is smaller than 0.2 MPa, the effect of the control is not high. When the pressure is larger than 30 MPa, the cost of the apparatus becomes higher and the safety becomes lower. The temperature is substantially decided in consideration of sorts of the solvent. Therefore the upper limit and the lower limit are changed by about 10° C. in accordance with the boiling point of the solvent.

After the pressurizing process 16, the mixture is cooled in the second cooling device 42 of the second cooling process to a temperature from 0° C. to 57° C. Although the temperature decreases even in the natural cooling, it is preferable to provide a cooling means such as the second cooling device 42 in order to prevent the deterioration of the polymer and the like. Further, there is an already known flash-evaporation device (not shown) between the press-heating device 41 and the second cooling device 42 to change the pressure back to the atmospheric pressure. Thus the concentration of the mixture becomes higher. However, the present invention is not restricted in the point of whether the decrease of the pressure from the large value and the adjustment of the concentration are made.

In the present invention, the viscosity and the dynamic storage elastic modules of the obtained polymer solution are not restricted especially. However, it is preferable that the viscosity is 1 to 400 Pa·s at 40° C. and dynamic storage elastic modules at 15° C. is at least 500 Pa, and particularly preferable that the viscosity is 36 to 200 Pa·s at 40° C. and dynamic storage elastic modules at 15° C. is at least 100 to 1,000,000 Pa. Further, it is preferable that the dynamic storage elastic modules are larger at less than the room temperature. For example, when the temperature of the support for the casting is $-5°$ C., the dynamic storage elastic modulus is preferably from 10,000 to 1,000,000 Pa at $-5°$ C., and when the temperature of the support for the casting is $-50°$ C., the dynamic storage elastic modules is preferably from 10,000 to 5,000,000 Pa at $-50°$ C.

In order to measure the viscosity and the dynamic storage elastic modules, the 1 ml sample of the polymer solution is set to a rheometer in the market (type; CLS 500, produced by TA instruments). The rheometer has a steel cone whose diameter is at 4 cm/2°. The measurement is made with use of Oscillation Step/Temperature Ramp, and the temperature is changed between 40° C. and $-10°$ C. at 2° C./min. On the basis of the data of the measurement, a static non-Newtonian viscosity n* (unit; Pa·s) and a storage modulus G' (unit; Pa) are obtained. Note that the temperature of the sample of the solution is adjusted to the preset value for starting the measurement, and thereafter, the measurement starts.

Note that the solubility changes depending on the variation of the raw materials of the polymer and the synthesizing method, even when the combination the polymer and the solvent is same. For example, there are one type of cellulose acylate, whose raw materials are wood pulp, and another type made of cotton linter, and the solubility is different between these two types. Further the solubility depends on the degree of acylation. Accordingly, it is preferable to decide in consideration with the conditions, whether the pressure is controlled or the pressurizing process 16 is provided.

Figure 3:
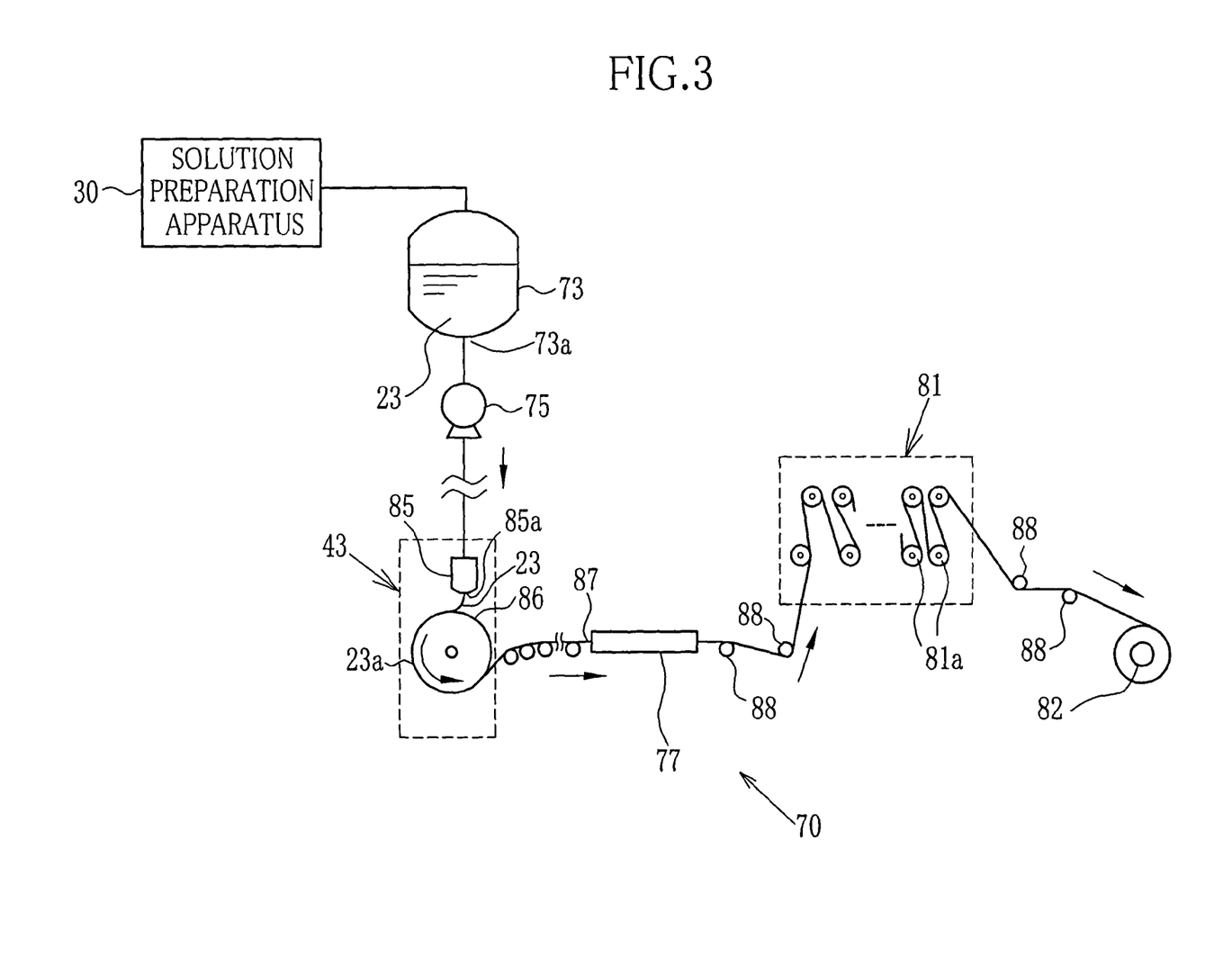
FIG. 3 is a schematic diagram of a film production equipment for a polymer film.

In followings, the method of producing a polymer film having above retardation from the above polymer solution. In FIG. 3, a film production equipment 70 includes the solution preparation apparatus 30 for preparing the polymer solution 23, a reserve tank in which the polymer film is supplied from the solution preparation apparatus 30, a feed pump 75, the casting apparatus 43, a tenter device 77, a roller-incorporated drying apparatus 81, and a winding apparatus 82.

In a reserve tank 73, the polymer solution 23 is stored for a predetermined time to perform the last treatments such as the defoaming and the concentration adjustment. The feed pump 75 is driven to feed the polymer solution 23 at a predetermined flow rate from an exit 73a of the reserve tank 73 to the casting apparatus 43. As the feed pump 75, a pressure type gear pump of fixed flow rate is used, and has a large effect to the present invention since the flow rate is adjusted with high accuracy by control of rotating speed of a gear. However, the present invention is not restricted in it.

The casting apparatus 43 has a casting die 85 and a metallic drum 86 as a support. Sorts and types of the casting die 85 are determined depending on the casting method, and the pressurization type is used in this embodiment. Instead of the drum 86, a belt which is moved with support of back-up rollers is used as the support. Further, rollers 88 are disposed between the casting apparatus and the winding apparatus 82, so as to support and transport a polymer film 87 peeled from the drum 86. The number of the rollers are not restricted in FIG. 4, and may be larger and smaller adequately. Further, it is determined adequately, whether these rollers a driven type or the non-driven type. Note that only part of the rollers are illustrated in FIG. 4 for easiness of the figure.

About the tenter device 77, the roller-incorporated drying apparatus 81 and the like, the positional relation, the number, the combinations and the like thereof are changed in accordance with the sorts of the produced polymer film 87. Further, for example, when the photosensitive material of the silver halide and the film used for a functional protective film for an electric display are produced, the film production equipment 70 is provided with several sorts of coating apparatuses for forming a undercoating layer, antistatic layer, antihalation layer, protective layer and the like. To such type of the film production equipment is applied a technique described in Japan Institute of Invention and Innovation (JIII) JOURNAL of Publication No. 2001-1745 (issued on Mar. 15, 2001 by Japan Institute of Invention and Innovation, p25-30). The explanation of the processes in this publication is separated into descriptions about the casting, a metal support, the drying, the peeling and the like.

A method of producing the polymer film of the present invention with use of the film production equipment 70 will be explained in followings. The polymer solution 23 is fed from the reserve tank 73 to the casting die 85 by the feed pump 75, and continuously cast on the rotating drum 86 through a slit 85a of the casting die 85. The cast polymer solution 23 forms a casting film 23a on the drum 86. When having the self-supporting properties, the casting film 23a is peeled as the polymer film 87 containing the solvent. In order to peel the polymer film 87 from the drum 86, the polymer film 87 is wound by a roller most upstreamly disposed among the rollers 88. Thus the peeling is continuously made.

The temperature around the circumstance of the polymer solution 23 and the casting film 23a in the casting apparatus 43 is preferably in the range of $-50$ to 50° C., particularly $-30$ to 40° C., and especially $-20$ to 30° C. When the polymer solution 23 is a cellulose ester solution, the polymer solution 23 is cast at the lower temperature than the room temperature onto the drum 26 so as to make the cooling on the drum 26 in a short time, and the polymer film 87 containing the organic solvent can be maintained by increasing the gel-strength.

Thus, without evaporating the organic solvent from the casting film of cellulose ester, the peeling can be made in a short time after the casting, and therefore the high speed casting can be made. Note that when it is necessary to cool the casting apparatus 43 in the above range of the temperature, the cooling device is not restricted especially, and may be air, nitrogen, argon, helium and the like. Further, the relative humidity is preferably in the range of 0 to 70%, and especially 0 to 50%. The temperature of the drum is preferably in the range of −50 to 130° C., particularly −30 to 25° C., and especially −20 to 15° C. In order to keep the temperatures in the above ranges in circumstance of the casting apparatus 43, it is preferable that a cooled gas is supplied into the casting apparatus 43 of a closed system or the casting apparatus 43 has a cooler. In order to prevent the influence of the moisture, it is preferable to use the drying air and the like.

The peeled polymer film 87 is transported to the tenter device 77. In the tenter device 77, the width of the polymer film 87 is regulated, and dried with the stretch. The tenter dryer 77 has tenter clips (not shown) which moves on tenter tracks (not shown) with support of both side edge portions of the polymer film 87. The moving tenter clips transport the polymer film 87. Instead of the tenter clips, pins may be used for sticking the polymer film 87. The open and close of the tenter clips are controlled by a controller (not shown), so as to regulate the keep and release of the polymer film 87. the tenter clips keeping the polymer film 87 moves in the tenter dryer 77, and are clip members thereof are opened in the automatic control to release the polymer film 87.

In the present invention, the optical anisotropy is adjusted by stretching the polymer film 87 if necessary, and thus the optical anisotropy can be adjusted. Accordingly, it is preferable in the present invention that not only the polymer solution is produced by the above preparation method but also the stretching of the polymer film 87 is made. The stretching is usually made in a lengthwise direction or a widthwise direction, and may be a one axial stretch or a two axial stretch. For example, each rotation speed of the feed rollers for transporting the film is adjusted, and the winding speed of the polymer film 87 is made faster than the peeling speed of the polymer film 87. In this case, the polymer film 87 is stretched in the lengthwise direction. Further, the tenter clips keeps both edge portions to feed the film 87 such that the distance of the orbits may become larger downstream. Thus the tenter clips moving with clipping the side edges of the film as described above stretch the film by little and little in the widthwise direction. Furthermore, after the film is dried, the stretching (for example a one axial stretching) is made by a predetermined stretcher. The stretch ratio is preferably 0.5 to 300%, particularly 1 to 200%, and possibly 1 to 100%. The stretch rate is a rate of a difference y between the stretched length and the original length X to the original length x, and a value obtained from a formula of (y/x)×100. The stretching can be made once or in plural steps. When the stretch is made in the plural steps, it is necessary that the product of the stretch rate of all steps is in the above range.

Further, the stretch is made under the room temperature or the increased temperature with the heating. Adequately, for example, the solvent remain in the polymer film 87 as in this embodiment. In the stretch under the increased temperature, it is preferably at most the glass transition point Tg.

The stretching speed is preferably in the range of 5 to 1000%/min., and preferably 10 to 500%/min. Further, it is preferable to perform the stretch with use of a heat roll and/or a radiant heat source (an IR heater and the like). Further, in order to increase the uniformity of the temperature of the film in the stretch, a constant-temperature oven may be provided.

To the stretching can be applied a technique described in the Japan Institute of Invention and Innovation (JIII) JOURNAL of publication No. 2001-1745 (issued on Mar. 15, 2001, by Japan Institute of Invention and Innovation, p. 29-30).

The polymer film 87 stretched in the tenter device 77 is fed to the next process by a rollers for support or transportation, and dried enough with support or transport by the plural rollers 81a. Thereafter, the film is wound as the product.

Thus the polymer film in which the above retardation values are regulated can be obtained. Further, the present invention is effective not only to the film having single layer structure, but also the film having multi-layer structure that is formed in the sequential casting method or a co-casting method. In order to produce the polymer film having more than two layers, the polymer solutions for forming respective layers are preferably in the processes illustrated in FIGS. 1, 3, 4. The polymer film having multi-layer structure from these solutions is a film in which the retardation is regulated as described above.

Further, the film of the present invention is used in several optical use, especially in the polarizing filter, a birefringence filter, an image displaying apparatus and the like.

The polymer film described above usually has a multi-layer structure constructed by adhering the other functional film and forming coating layers. As the functional layer to be provided, for example, there are a polarized layer, an undercoating layer and the like. When other layers are provided, the surface treatment of the obtained polymer film is made by a predetermined method. Thus the adhesiveness of the polymer film and the several sorts of the functional films are increased.

As the methods for surface treatment, there are especially preferable, for example, glow discharge treatment, exposure to UV radiation, corona discharge treatment, flame treatment, and acid or alkali treatment. In the present invention can be further formed the several sorts of the functional layers disclosed in Japan Institute of Invention and Innovation (JIII) JOURNAL of disclosure No. 2001-1745 (issued on Mar. 15, 2001, published by Japan Institute of Invention and Innovation, p. 32-45).

To the present invention can be applied a technique according to the coating layers, which is disclosed in Japan Institute of Invention and Innovation (JIII) JOURNAL of disclosure No. 2001-1745 (issued on Mar. 15, 2001, published by Japan Institute of Invention and Innovation, p. 32-45).

Further, protective films are adhered to both surfaces of the polarized film produced by the polyvinyl alcohol (PVA) type film to obtain the polarized filter of the present invention. In the present invention, note that the producing method of the polarizing filter is not restricted, and the production can be made by the production method already known.

The polarized film is obtained by dying the polyvinyl alcohol type film, and as the usual dying method there are a gas phase adsorption method and a liquid phase adsorption method. In this embodiment, the dying is made in the liquid phase adsorption method.

In this embodiment, iodine is used for the liquid phase adsorption. However, the present invention is not restricted in it. The polyvinyl alcohol film is dipped in the iodine/potassium iodide (KI) solution for 30 to 5000 seconds and stretched. Preferably, the concentration of iodine in the solution is 0.1 g/little to 20 g/little, and that of potassium iodide is 1 g/litter to 10 g/litter. The temperature of the solution at the dipping is preferably set in the range of 5° C. to 50° C.

In the liquid phase adsorption method, a solution of iodine or other dye may be coated or sprayed on the polyvinylalcohol film in a way already known, instead of the above method of dipping the polyvinylalcohol film. The polyvinylalcohol may be colored before or after stretching. However, after being colored, the polyvinylalcohol film adequately swells and is easily tensed. Accordingly, it is preferable that the polyvinylalcohol film is stained before stretching.

Instead of iodine, dichroic dye (including pigments) is preferably used. In the dichroic dyes, there are dye materials of azo type dyes, stilbene type dyes, pyrazolone type dyes, triphenylmethane type dyes, quinoline type dyes, oxadine type dyes, tiadine type dyes, anthraquinone type dyes and the like. Preferably, the dye materials can be dissolved to water. Preferably, a dichroic dye molecule has hydrophilic group, such as sulfonic acid group, amino group, hydroxyl group and the like.

In the process for producing the polarized film by stretching the polyvinylalcohol type film after coloring, compounds (or cross-linking agent) for cross-linking polyvinylalcohol is used. Concretely, the polyvinylalcohol type film is dipped into a solution of the cross-linking agent before and in the stretching process, and otherwise the cross-linking agents are coated or sprayed onto the polyvinylalcohol type film. Thus, the polyvinylalcohol type film is hardened so as to have adequate orientation. Note that the cross-linking agent of polyvinylalcohol type polymer is preferably boric acid based materials, but is not restricted in them.

Otherwise, when it is designated that the cellulose acylate film is used as the protective film in the above embodiment, it is preferable to perform the surface treatment before the adhesion of the polarized film. In this embodiment, alkali treatment is applied as the surface treatment. However, instead of the alkali treatment, the easily adhesive treatment described in Japanese Patent Laid-Open Publication No. 6-94915 and 6-118232 may be performed.

As the adhesive agent for adhering to the cellulose acylate film the polarized films obtained as above described, the adhesive agent already known can be used. Especially preferable are polyvinylalcohol type adhesive agent (polyvinylalcohol, polyvinylbutylal and the like), vinyl type latex (butylacrylate and the like) and the like. In this embodiment, the completely saponificated polyvinyl alcohol is used.

The polarizing filter is constructed of a polarized film as a polarizer, a protective film for protective both surfaces of the polarized film. In this embodiment, the cellulose acylate film described above is used as the protective film. Further, one film is adhered to each of the surfaces of the obtained polarizing filter for protecting the polarizing filter at shipping and checking the polarizing filter as the products, and the like. One of the adhered film is sometimes called an outer protective film which is used for protective a surface of the polarizing filter and disposed to another surface than the surface for adhering the polarizing filter to the liquid crystal filter. Another one of the adhered films is sometimes called an outer separate film which is used for covering the adhesive layer to adhere the liquid crystal filter and therefore disposed to the surface through which the polarizing filter is adhered. Usually, the liquid crystal display is provided with the liquid crystal cell has two orientation films and liquid crystal materials sandwiched between the two orientation films. Accordingly, in the liquid crystal display, the number of the protective films are four and the polymer films of the present invention, and thus the liquid crystal display have excellent displaying properties. Especially, the film of the present invention can be adequately used as the protective film between the polarized film and the liquid crystal cell in the liquid crystal device, and has a function as the retardation filter.

The birefringence filter, the optical compensation sheet, the polarizing filter, in which the polymer film of the present invention is used, are used for the liquid crystal display of the display mode. As the display mode, there are TN (Twisted Nematic), IPS (In-Plane Switching), FLC (Ferroelectric Liquid crystal), AFLC (Anti-ferroelectric Liquid Crystal), OCB (Optically Compensatory Bend), STN (Super Twisted Nematic), VA (Vertically Aligned), HAN (Hybrid Aligned Nematic) and the like. Further, the liquid crystal device in which the orientation of the above displaying mode is divided is proposed. Furthermore, the above retardation filter, optical compensation sheet, polarizing filter can be adequately used in the liquid crystal display of the transmissive type, the reflective type and the semi-transmissive type.

Further, the polymer film of the present invention is used as the retardation filter and a support of the retardation filter also in any of the displaying modes. The displaying modes are already known, for example, the liquid crystal display of the TN-reflective type is described in the Japanese Patent Laid-Open Publication No. 10-123478, International Publication under PCT No. 98/48320, Japanese Patent No. 3022477 and the like. Further, the optical compensation sheet of the reflective type liquid crystal display is described in International Publication under PCT No. 00/65384. Further, the polymer film of the present invention is adequately used as the support of the optical compensation sheet of the ASM (Axially Symmetric Aligned Microcell) mode liquid crystal display having the liquid cell. The liquid cell of the ASM mode has characters that the thickness of the cell is kept by a resin spacer whose position can be adjusted. Other characteristics of the liquid crystal cell of the ASM mode is the same as the TN mode. Note that the liquid crystal cell of the ASM mode and the liquid crystal device of the ASM mode are described in the essay; Kume et al., SID 98 Digest 1089 (1998). The way of use of the polymer film of the present invention described above is described in Japan Institute of Invention and Innovation (JIII) JOURNAL of disclosure No. 2001-1745 (Issued on Mar. 15, 2001, by Japan Institute of Invention and Innovation, p. 45-59).

Example 1

(Experiment 1)

The polymer solution was prepared with use of the solution preparation apparatus 30 in FIG. 2 in the processes shown in FIG. 1. The detail of the preparation was as follows. The stainless first tank 31 whose capacity was 400 litter was supplied with the solvent below at the following mixture ratio. The polymer A was added little by little, and several sorts of the additives of the following mixture ratio were added. Thus the mixture of them was obtained such that the total weight of the mixture might be 200 kg. Thereafter, the mixture was stirred.

The stirring was made in the first tank 31 such that at first the haring speed was 15 m/sec and the sharing force was $5 \times 10^5 N/m^2$. Then stirring was made for 30 minutes such the haring speed was 1 m/sec and the sharing force was $1 \times 10^5 N/m^2$. The temperature at the start of stirring was 25° C., and the cooling water whose temperature was controlled to a predetermined value was used as the heat transfer medium 51. Thus the temperature of the mixture at end of stirring was 35° C. After the stirring, the high-speed stirring was stopped, and the stirring was made again for 100 minutes such that the stirring blades 46 rotated at 0.5 m/sec. Thus the polymer A was swollen. Until the end of swelling, the pressure was applied to be 0.12 MPa by the nitrogen gas. Thereby the concentration of oxygen in the tank was less than 2 vol %, and there were no problems in preventing the explosion.

| (Solid Content) | |
|---|---|
| Polymer A<br>(powder of cellulose triacetate; degree of substitution,<br>2.91; viscometric average degree of polymerization, 270; degree<br>of acetylation, 0.93; content of acetone extract, 7% by mass;<br>(weight average molecular weigh)/(number average molecular<br>weight) 2.3; moisture content, 0.4% by mass; viscosity of 6%<br>by mass of dichloromethane solution, 305 mPa · s; content of<br>remaining acetic acid, less than 0.1% by mass; content of Ca,<br>65 ppm; content of Mg, 26 ppm, content of Fe, 0.8 ppm, content of<br>$SO_4^-$, 18 ppm; yellow index, 1.9; content of free acetylic acid,<br>47 ppm; averaged particle diameter, 1.5 mm; standard deviation, 0.5 mm.) | 20 pts. by mass |
| Plasticizer A (Triphenyl phosphate) | 1.6 pts. by mass. |
| Plasticizer B (biphenyldiphenylphosphate) | 0.8 pts. by mass. |
| Deterioration inhibitor<br>(2,6-di-t-butyl-4-methylphenol) | 0.2 pts. by mass. |
| UV-absorbing agent a<br>(2,4-bis-(n-octylthio)-6-(4-hydroxy-3,5-di-tert-butylanylino)-<br>1,3,5-triadine | 0.2 pts. by mass. |
| UV-absorbing agent b<br>(2-(2'-hydroxy-3',5'-di-tert-butylphenyl)-5-<br>chrolobenzotriazol) | 0.2 pts. by mass. |
| UV-absorbing agent c<br>(2-(2'-hydroxy-3',5'-di-tert-amilphenyl)-5-<br>chrolobenzotriazol) | 0.2 pts. by mass. |
| Particles<br>(silica having diameter of 20 nm, and Mohrs hardness about<br>7) | 0.05 pts. by mass. |
| Ethyl citrate esters<br>(monoester:diester = 1:1) | 0.04 pts. by mass. |
| (Solvent) | |
| dichloromethane | 80.0 pts. by mass. |
| methanol | 10.0 pts. by mass. |
| butanol | 5.00 pts. by mass. |

The water content of each dichloromethane, butanol, methanol and ethanol was at most 0.2% by mass. Further, it was checked that the water content of the mixture was less than 0.2% by mass.

Thus the non-uniform gel-like mixture is obtained and fed by a screw pump in which an area around the center shaft is heated to 30° C. and a cooling part is cooled from periphery of the screw by a heat transition medium to feed the mixture at −75° C. for three minutes. The heat transition medium was a cooling medium cooled to −80° C. by a cooler. Then the mixture after the cooling is fed to the stainless second tank 36 by the screw pump with heating to 35° C. In the second tank 36, the mixture was stirred at 50° C. for two hours to the uniform solution. The uniform solution was filtrated by the first and second filtration devices 37, 38. A filter of the first filtration device 37 was a filter paper whose absolute filtration accuracy was 0.01 mm (#63 produced by Toyo Roshi Kaisha). A filter of the second filtering apparatus 38 was a filter paper whose absolute filtration accuracy was 2.5 μm (FH025, produced by Pall Corporation). The obtained mixture was heated at 110° C. under 1 MPa in the press-heating device 41 of the feed pipe, and flashed into a tank whose inside pressure was the atmospheric pressure, such that predetermined quantity of the organic solvent might be evaporated. Then the mixture was cooled to 40° C. in the second cooling device 42 to the polymer solution whose concentration was 24.0%. The viscosity of the solution was 120 Pa·s at 40° C., and the dynamic storage elastic modules was 3800 Pa. The dynamic storage elastic modules at −5° C. was 35000 Pa, and that at −50° C. was 240000 Pa. Note that the polymerization degree of aggregate was in the range of 2.8 millions to 3.2 millions.

Then the plastic solution at 40° C. was cast through a casting die by the solution casting equipment 70 onto the drum 86 as a mirror surfacing stainless support while the diameter of the drum was 3 m. The shape of the used casting die was similar to that one disclosed in Japanese Patent Laid-Open Publication No. 11-314233. Note that the casting speed was 75 m/minutes and the casting width was 200 cm. The inner temperature of the casting apparatus 43 was 15° C. The peeling was made at 50 cm before the casting position, and both edge portions were clipped in the tenter device 77. the film is transported into the roller-incorporated drying apparatus 81. In the drying, the drying air at 45° C. was fed at first and then the drying was made at 110° C. for five minutes. Thereafter, the drying was made at 145° C. for 10 minutes, and thereby the temperature of the film was 140° C. The obtained film was 80 μm in thickness. Both edge portions of the obtained film were slit off to be 3 cm, and then the knurling was made at 2 to 10 mm from both edges to be odd-shaped with height of 100 μm. Then the film was wound in roll. The retardation of the film was measured and the results of the measurement are shown in Table 1. Note that the unit of all values is nm in Table 1.

(Experiment 2)

The obtained polymer film 87 was stretched as follows. The one-axial stretching of the polymer film 87 was made in the lengthwise direction. The roller of the roller stretcher was an induced heating type jacket roller on whose surface the mirror treatment was made. The temperature of each roller was independently adjusted. The stretch zone was covered with the casing and the temperature thereof was kept at 130° C. The roller before the stretch section was heated little by little to 130° C. The stretch length was adjusted such that the ratio L/W of the distance (L) between the neighboring rollers and the width (W) of the birefringence filter was 2.5. After the stretch, the film was cooled and wound. The stretch magnification was measured and the value thereof was 1.15. Further, the thickness of the film was 80 μm. Other conditions were the same as Experiment 1.

(Experiment 3)

The plasticisers A and B were not added. Other conditions were the same as Experiment 1.

(Experiment 4)

The plasticisers A and B were not added. Other conditions were the same as Experiment 2.

(Experiment 5)

Instead of the plasticisers A and B, 2.4 pts. by mass. of a plasticiser C (triphenylmethanol) were added. Other conditions were the same as Experiment 1.

(Experiment 6)

Instead of the plasticisers A and B, 2.4 pts. by mass. of the plasticiser C (triphenylmethanol) were added. Other conditions were the same as Experiment 2.

(Experiment 7)

As the solvent, a mixture of 92.0 pts. by mass dichloromethane and 8.0 pts. by mass methanol was used. Other conditions were the same as Experiment 1.

(Experiment 8)

As the solvent, a mixture of 92.0 pts. by mass dichloromethane and 8.0 pts. by mass methanol was used. Other conditions were the same as Experiment 2.

(Experiment 9)

Instead of the polymer A was used a polymer B (cellulose triacetate; degree of substitution, 2.92, viscometric average degree of polymerization, 300; degree of acetylation at $6^{th}$ position, 0.94). Other conditions were the same as Experiment 1.

(Experiment 10)

Instead of the polymer A was used the polymer B (cellulose triacetate; degree of substitution, 2.92; viscometric average degree of polymerization, 300; degree of acetylation at $6^{th}$ position, 0.94). Other conditions were the same as Experiment 2.

(Comparison 1)

Instead of the polymer A was used a polymer C (cellulose triacetate; degree of substitution, 2.86, viscometric average degree of polymerization, 310; degree of acetylation at $6^{th}$ position, 0.89). Other conditions were the same as Experiment 1.

(Comparison 2)

Instead of the polymer A, the polymer C was used. Other conditions were the same as Experiment 2.

(Comparison 3)

Instead of the polymer A was used a polymer D (cellulose triacetate; degree of substitution, 2.79, viscometric average degree of polymerization, 310; degree of acetylation at $6^{th}$ position, 0.90). As the solvent, a mixture of methyl acetate (64.8 pts. by mass), acetone (6.4 pts. by mass), ethanol (6.4 pts. by mass) and butanol (3.2 pts. by mass) was used. Other conditions were the same as asp Experiment 1.

(Comparison 4)

Instead of the polymer A was used the polymer D. As the solvent, a mixture of methyl acetate (64.8 pts. by mass), acetone (6.4 pts. by mass), ethanol (6.4 pts. by mass) and butanol (3.2 pts. by mass) was used. Other conditions were the same as Experiment 2.

(Comparison 5)

Instead of the polymer A was used a polymer E (polycarbonate co-polymer; in monomers of the co-polymer, bisphenol A and 9,9-bis(4-hydroxy-3-methylphenyl)fluorene at 1:1 mol ratio were used as bisphenol elements). As the solvent, dichloromethane (100 pts. by mass) was used. Other conditions were the same as Experiment 1.

(Comparison 6)

Instead of the polymer A was used the polymer E. As the solvent, dichloromethane (100 pts. by mass) was used. Furthermore, the content of solvent in the film before the stretching was adjusted to 2% by mass to the polymer E. The temperature at the stretch was 218° C., L/W rate was 1.2, and the stretch magnification was 1.3. Other conditions were the same as Experiment 2.

(Comparison 7)

Instead of the polymer A was used a polymer F (polycarbonate; polycarbonate polymer, only bisphenol A was used as a single monomer of bisphenol elements). As the solvent, dichloromethane (100.0 pts. by mass) was used. Other conditions were the same as Experiment 1.

TABLE 1

|  | Re (nm) | Rth (nm) | ΔRe (nm) | ΔRth (nm) |
|---|---|---|---|---|
| Experiment 1 | 1 | 8 | −2 | 35 |
| Experiment 2 | 26 | 19 | −22 | 37 |
| Experiment 3 | 4 | −7 | −4 | 42 |
| Experiment 4 | 23 | 7 | −26 | 44 |
| Experiment 5 | 3 | −31 | −2 | 15 |
| Experiment 6 | 28 | −20 | −23 | 16 |
| Experiment 7 | 2 | 9 | −2 | 36 |
| Experiment 8 | 27 | 20 | −22 | 38 |
| Experiment 9 | 3 | −11 | −3 | 35 |
| Experiment 10 | 22 | 1 | −24 | 36 |
| Comparison 1 | 1 | 36 | 1 | 16 |
| Comparison 2 | 11 | 41 | 11 | 16 |
| Comparison 3 | 10 | 87 | 2 | 12 |
| Comparison 4 | 40 | 86 | 10 | 9 |
| Comparison 5 | 1 | 15 | 1 | 9 |
| Comparison 6 | 127 | −3 | 58 | 0 |
| Comparison 7 | 37 | 28 | −7 | −3 |

Table 1 teaches the following. The films obtained in Experiments 1-10 have different sings between the ΔRe and the ΔRth. The ΔRe is positive and the ΔRth is negative. Further the films in Experiments 1-10 have the |ΔRth| in the range of 10 nm to 1000 nm. The films obtained in Comparisons 1-7 have the same signs sings between the ΔRe and the ΔRth. Further, Table 1 teaches that the method of producing the polymer solution of the present invention is effective to obtain the film having the optical properties in Experiments 1-10.

Example 2

In Example 2, the polyvinyl alcohol film (produced by Kuraray Co. Ltd) having 75 μm thickness was dipped in an aqueous solution at 25° C., while the aqueous solution contains 0.3 g/litter iodine and 18.0 g/litter potassium iodide. Thereafter the film was tensed in an aqueous solution at 50° C., while this aqueous solution contains 80 g/litter boric acid and 30 g/litter potassium iodide. Thus the film becomes five times larger to the polarized film. The cellulose acetate film obtained in Example 1 was adhered to the polarized film with the adhesive agent, and thereafter they are dried for 30 minutes in thermostatic chamber in which the temperature of air was kept at 80° C. Note that the adhesive agent was a 4% aqueous solution of polyvinyl alcohol (trade name; PVA-117H, produced by Kuraray Co. Ltd.).

According to the obtained polarizing filter, a parallel transmittance Yp and a crossed transmittance Yc in the visible range was obtained with a spectrophotometer, and the polarizing coefficient PY was calculated on the basis of the following formula:

$$PY=\{(Yp-Yc)/(Yp+Yc)\}^{1/2} \times 100(\%)$$

As the result of examination of Example 2, the polarizing coefficient PY of any polarizing filter constructed of the film produced in Example 2 was at least 99.6%. The film obtained in the solution casting method of the present invention was adequately used for the polarizing filter.

Example 3

The films obtained in Examples 1-10 of Example 1 were used as the birefringence filter, whose estimation was made. The film was cut to film sheets of a predetermined size, and the Re and Rth of each film sheet were measured at predetermined points. Further, the film sheets were heat-treated at 100° C. for 24 hours, and then the variation of the Re and Rth thereafter were measured.

The fluctuations of the Re and Rth of the obtained film sheets were ±2 nm. The changes of the Re and Rth between before and after the heat treatment were in the range of ±5 nm. Accordingly the film obtained in the present invention was used adequately to the birefringence filter.

Example 4

A polarizeing filter in a viewer's side of a TN liquid crystal display of transparent type (hereinafter LCD) provided with a notebook type personal computer was exchanged to the polarizing filter obtained Experiment 2, while a D-BEF (produced by Sumitomo 3M) as a polarization separation film having polarization optional layer was provided between a back light and a liquid crystal cell in the LCD.

As the result of examination of Example 4, in the obtained liquid crystal display, the brilliance unevenness was not observed, and the quality of image was very high. The film obtained in the solution casting method of the present invention was adequately used for the liquid crystal display.

Various changes and modifications are possible in the present invention and may be understood to be within the present invention.

What is claimed is:

1. A polymer film having an in-plane retardation $Re(n)$ and a thickness retardation $Rth(n)$ measured with use of a light of wavelength n (unit;nm), wherein:
   $\Delta Re$ is calculated by $Re(700)-Re(400)$;
   $\Delta Rth$ is calculated by $Rth(700)-Rth(400)$, a sign of said $\Delta Rth$ being opposite to that of said $\Delta Re$; and
   the polymer comprises cellulose acylate, and the cellulose acylate has a degree of acylation of at least 2.87.

2. A polymer film as defined in claim 1, wherein said $\Delta Rth$ satisfies a formula of $10\ nm \leq |\Delta Rth| \leq 1000\ nm$.

3. A polymer film as defined in claim 1, wherein said $\Delta Re$ is a negative value.

4. A polymer film as defined in claim 1, wherein said polymer film is used as a retardation filter in a liquid crystal display including a liquid crystal layer sandwiched between a pair of orientation layers, and said retardation filter is oppositely disposed over one of said orientation layers to said liquid crystal layer.

5. A polymer film as defined in claim 1, wherein said polymer film is used as a protective film for a polarizing filter, and said protective film is adhered to at least one surface of a polarized film of said polarizing filter.

6. The polymer film as defined in claim 1, wherein said cellulose acylate has a degree of substitution of acetyl groups in the range of 0.0 to 3.0.

7. The polymer film as defined in claim 1, wherein said cellulose acylate has a degree of substitution of acyl groups, in which the number of carbon atoms is from 3 to 22, in the range of 0.0 to 3.0.

8. The polymer film as defined in claim 1, wherein said polymer film is produced from a polymer solution which is prepared from a mixture containing a polymer and a solvent, and a method of preparing said polymer solution comprising:
   (a) regulating a temperature of said mixture in a range of −10° C. to 50° C. such that said polymer swells;
   (b) cooling said mixture after the swelling, such that said temperature of said mixture is in the range of −100° C. to −10° C.; and
   (c) heating said mixture after the cooling, such that said temperature of said mixture is in the range of 0° C. to 57° C.

9. The polymer film as defined in claim 8, wherein said solvent comprises a chlorinated solvent.

10. The polymer film as defined in claim 8, wherein said cooling (b) is performed under an increased pressure, and said method further comprises:
    (d) pressurizing and heating said mixture after said heating (c), under a pressure from 0.2 MPa to 30 MPa, such that said temperature of said mixture is in a range of 60° C. to 240° C.

11. The polymer film as defined in claim 10, wherein the cooling (b) is performed under an increased pressure by using a screw pump, and the pressurizing in the step of pressurizing and heating (d), is performed by using a screw pump.

* * * * *